Dec. 3, 1963     T. C. FURNAS, JR     3,113,214
DIFFRACTOMETER SHUTTER
Original Filed Feb. 29, 1960
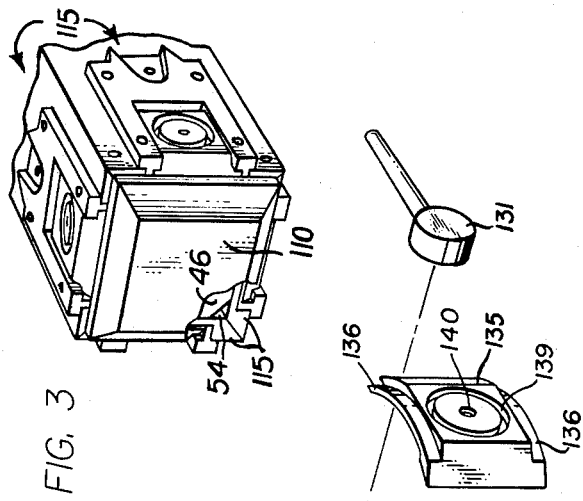
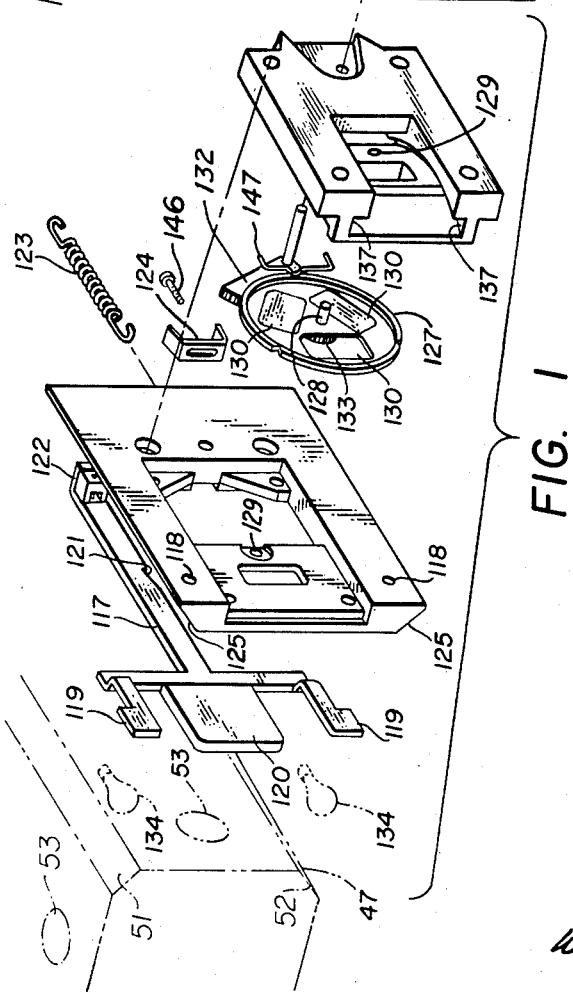
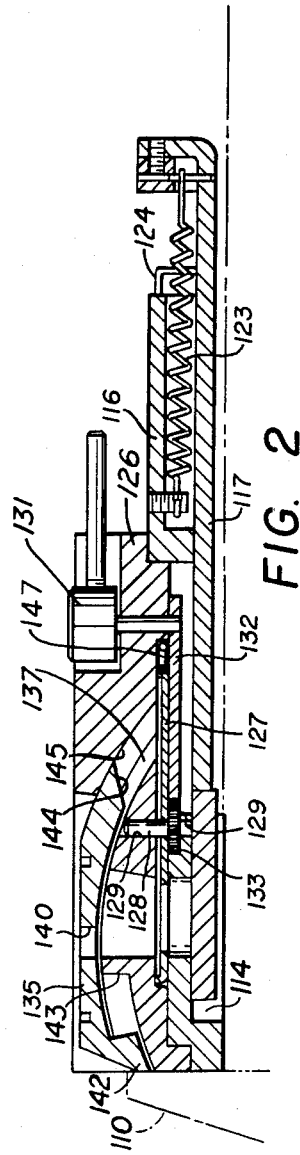
INVENTOR.
THOMAS C. FURNAS, JR.
BY
*Watts, Edgerton, Pyle & Fisher*
ATTORNEYS 3,113,214
DIFFRACTOMETER SHUTTER
Thomas C. Furnas, Jr., Cleveland Heights, Ohio, assignor to Picker X-Ray Corporation Waite Manufacturing Division, Inc., Cleveland, Ohio, a corporation of Ohio
Original application Feb. 29, 1960, Ser. No. 12,492. Divided and this application Apr. 20, 1961, Ser. No. 104,432.
27 Claims. (Cl. 250—105)

This invention pertains to a mechanism for non-destructive X-ray analysis and more particularly to a shutter especially suited for use in conjunction with a diffraction type X-ray tube.

This application is a division of United States patent application Serial No. 12,492, filed February 29, 1960, by Thomas C. Furnas, Jr., under the title, "Diffractometer," now abandoned. The X-ray tube shutter of this invention is suited for use with the diffractometer of the parent patent application and other diffractometers as well. In the present description, a brief outline of the diffractometer of the parent application will be set out to assist in the understanding of the merits of the present invention in the environment of its intended use. A more complete discussion of the diffractometer and diffraction studies will, then, be found in the parent application.

X-ray diffractometry and related arts, such as X-ray spectography, are now well-established scientific techniques. Through the art of diffractometry, it is possible to analyze a specimen as to chemical content, as to physical properties and characteristics, and as to spatial distribution and location of atoms and molecules without destroying that specimen. The usual technique is to position a specimen on a rotatable support. An X-ray tube is positioned in spaced relationship with the specimen and the specimen is irradiated by a suitably collimated beam of X-rays. The specimen will diffract the rays into a pattern which is characteristic to the specimen such that this pattern will, to the experienced observer, reveal these mentioned chemical and physical properties and characteristics, and through mathematical computations the mentioned spatial distribution can be determined.

One of the arts related to diffractometry utilizes what are known as diffraction cameras. With a diffraction camera, a film is positioned around the specimen and a photograph of diffracted rays is obtained. A diffractometer on the other hand is usually considered to encompass a mechanism wherein the diffracted rays are measured by a suitable detector, such as a scintillometer.

The detector is positioned on a suitable support which is rotatable relative to both the specimen and the X-ray tube. The detector is positioned, prior to the start of a study, in the path along which the X-rays will be diffracted from the specimen. The specimen will then be rotated, often back and forth, through an angle variously referred to as theta or as omega. The theta angle is the angle between the X-ray beam and a diffraction plane of a crystal under study. The diffracted rays will also be at an angle theta with this plane. The omega angle is the angle between the normal to a given reference plane in the specimen and the diffraction vector or bisector of the angle between the incident and the diffracted X-ray beams. As the specimen is rotated through an angle, theta, the detector must be rotated twice as rapidly through an angle, two-theta, to maintain its position in the path of the diffracted rays. Accordingly, the detector is usually supported on a support which is known as the two-theta support.

With prior arrangements it has been difficult to prevent the escape of "scatter" radiation at such places as where a collimator or a diffraction camera is connected to the housing of the X-ray tube. In addition, it has not been possible to connect a collimator or a diffraction camera to an X-ray tube while the tube was in operation. Making such a connection when a tube is operating may be desirable to conduct, for example, a simultaneous study through a second collimator carried by a second diffractometer or a simultaneous study with a camera while the diffractometer is in use.

The diffractometer of the parent patent application is designed so that a pair of diffractometers can be conveniently and simultaneously operated with one X-ray tube as a source of X-ray energy. The tube shown in that diffractometer is a four-windowed tube positioned in such a way that three studies can be made simultaneously. Thus, two diffractometers may be connected to the tube and a diffraction camera may also and simultaneously be connected. As is indicated in that application, it is contemplated and possible to conduct four simultaneous studies. One method of accomplishing four such studies is to position a tube in the center of a table so that all four windows are accessible at once.

The present invention provides, for the first time, a means whereby one of a plurality of studies may be set up and begun before the other of the plurality of studies are set up. The second, third, and fourth studies, then, can be set up as one or more other studies are in progress.

Another of the features of the present invention resides in the fact that a collimator or camera can be adjusted relative to the tube for alignment without disturbing the tube and without in any way hampering the ability of the shutter to provide complete, thorough, and adequate shielding. This shielding protects against both direct and scatter radiation.

Another feature of the invention is that full and complete shielding for diffraction and similar studies has been provided for the first time. In the past, the practice has been to set up a diffraction tube for one or more studies, place a strip of lead foil or the like over the tube, wrap the foil around the tube to provide makeshift shielding, and then to undertake a study.

The present invention achieves all of these features by providing a shutter housing which is secured to the X-ray tube. The housing has an aperture that circumscribes the X-ray tube window. A shutter is carried by the housing and movable to selectively open and close the aperture. The housing includes a mounting plate and a connector plate. The connector plate is loosely carried by the retainer mounting plate for universal relative movement. A supporting plate is provided which overlaps the connector plate is all directions so that even though the connector plate is loosely carried and relatively adjustable, there is no path for the escape of X-rays. The collimator or camera is connected to this loosely carried connector plate.

The shutter mechanism of this invention also includes a rotatable filter wheel which is carried by the housing and a means to rotate the wheel and index one of a plurality of filters into the path of X-rays emitted by the tube window. Thus, for the first time, a filter made as an integral part of a shutter mechanism is provided.

Lights and light apertures are provided. These lights are normally connected into the tube main power circuit so that when the tube is in operation the lights are lit. If the shutter is closed, the light is blocked; if it is open, there is a visible indicia of the fact that a given shutter is open. Thus, the shutter includes an arrangement to warn the operator of its condition.

As a further safeguard, the shutter includes a spring biasing the shutter toward a closed position. The shutter is designed so that it may be manually actuated and locked open when that is desired. It is also designed for a normal and intended operation in which the shutter will be opened by a solenoid or the like, preferably energized by a timer circuit which determines the duration of a given study. At the conclusion of a study or with a power failure, the spring will immediately bias the shutter into the closed and safe position.

Other features and a fuller understanding of the invention may be had by referring to the following description and claims taken in conjunction with the accompanying drawings, in which:

FIGURE 1 is an exploded view of one of the novel and improved shutter assemblies;

FIGURE 2 is a sectional view of one of the novel and improved shutter assemblies; and FIGURE 3 is a perspective view showing four of the shutter assemblies secured to an X-ray tube housing with a generally square end.

In FIGURE 1 there is a fragmentary showing of the anode end of an X-ray tube housing 47. The housing is substantially square in cross section with chamfered corners. Two of these chamfered corners are shown in FIGURE 1 and designated by the numerals 51, 52; and a third, 54, is visible in FIGURE 3. Each of the four faces of the tube housing 47 has an X-ray window 53, two of which are shown.

As will best be understood by reference to FIGURE 3 of the drawings, there are four shutter assemblies designated generally by the numeral 115. One such assembly 115 is connected to each face of the tube housing 47 adjacent its anode end. A suitable end cap 110 is preferably fixed to the anode end of the housing overlying both the housing 47 and the outer ends of each of the four shutter assemblies 115.

In FIGURES 1 and 2 the details of one of the four shutter assemblies are shown. This one assembly will be described in detail, it being recognized that the other three assemblies are identical.

A shutter retaining mounting plate 116 is fixed to one face of the anode end 47 of the X-ray tube housing. The plate 116 has a recess 114 in the face adjacent the housing 47. A shutter member 117 is positioned in the recess 114 for rectilinear movement relative to the mounting plate 116.

The mounting plate has a pair of light emitting holes 118 near the top. The shutter 117 includes a pair of light blocking arms 119 and an X-ray window cover plate or shutter 120. The shutter member 117 also has a downwardly extending arm. The shutter arm has a notch 121 in its side and a control tab 122 at its end remote from the shutter 120. A spring 123 is interposed between the shutter and the mounting plate 116 normally urging the shutter member into a closed position. When the shutter member is in the closed position, the shutter 120 is positioned across the tube window 53 to block the emission of X-rays. The light blocking arms 119 are positioned across the light apertures 118 to prevent the emission of light through the apertures when the shutter member is closed.

A latch member 124 is connected to the lower end of the mounting plate 116 by a mounting pin 146. The latch is slidable rectilinearly relative to the mounting pin and the mounting plate 116.

The shutter member may be opened manually to facilitate setting up a diffractometer or diffraction camera for a study. When the shutter member is manually opened, latch 124 may be slid manually to engage the notch 121. This notch-latch engagement holds the shutter member in an opened position exposing both the X-ray window and the light apertures 118. When cameras are in use in a study, the shutter is normally held open by a solenoid, not shown. Preferably the solenoid is in a timer circuit, so that the shutter will automatically close at the conclusion of a study. The shutter will also close automatically if there is a power failure.

Lights 134 are provided and positioned in line with the apertures 118 and behind the arms 119. The lights 134 are turned on when the main power of the X-ray generator is turned on. Thus, before the X-ray tube is turned on, the operator will have a visual indication through apertures 118 as to whether or not a shutter member is open.

The mounting plate 116 is chamfered on either side at 125. This construction permits the use of the four assemblies 115. These four assemblies are mounted such that the mounting plates 115 completely surround the tube anode housing 47. Each light is positioned within the space afforded by the chamfers on the tube housing 47 between the shutting plates 115 and the tube housing. With the four assemblies 115 mounted in this manner and the lights 134 positioned as described, each light may be seen through one of the apertures 118 in each of two of the mounting plates 116. This construction safeguards against the failure of one of the lights. Even if one light fails, there is a light visible through an aperture in each of the mounting plates.

A filter retainer plate 126 is secured to the mounting plate 116. A filter wheel 127 has a shaft 128 which projects into suitable openings 129 in the plates 116, 126. The filter wheel 127 has, in the preferred and disclosed embodiment, three filter windows 130 which carry suitable X-ray filter elements. Rotative adjustment of the filter wheel is obtained by a handled rotating knob 131 which is connected to a gear segment 132. The gear segment 132 engages a pinion 133 which is mounted on the filter wheel shaft 128. A detent 147 is carried by the filter retainer plate 126 to locate the filter wheel in a selected one of three positions with a filter 130 aligned with the X-ray beam.

A collimator connector plate 135 is carried by the filter retainer plate 126. The collimator connector plate has oppositely directed tongues 136, each of which is arcuately curved. The tongues 136 loosely fit in complemental arcuately curved grooves 137 formed in the filter adaptor plate 126. An annular recess 139 circumscribes an X-ray window 140 in the collimator connector plate 135. The connector plates 135 may be shifted up and down about the axis of the arcuately curved togues 136 and may be rocked sideways due to the loose fit of the tongues 136 and the grooves 137. This permits proper collimator alignment with the X-ray tube focal spot while the X-ray tube is turned on without any danger of scatter radiation or other hazards. Thus, the mounting plate 116, the retainer plate 126 and the connector plate 135 are secured together to provide a housing for the shutter 120 and the filter wheel 127 and its actuating mechanism. It is a housing which defines a through passage for an X-ray beam, but is otherwise impervious to X-ray penetration. This imperviousness is maintained even though the connector plate 135 is movable relative to the retainer plate 126. This imperviousness is obtained because these two plates overlap one another completely around the periphery of the connector plate at all times. The overlap along the sides is obtained by the tongue and groove 136, 137 discussed above. Along the outer edge of the connector plate an inwardly directed lip 142 is provided on this plate which overlies a transverse shoulder 143 on the retainer plate. The inner edge 144 of the connector plate projects into a curved recess 145 to provide overlapping at that end. The lip 142, the shoulder 143, the recess 145, and the inner edge 144 all extend from one tongue and groove to the other to provide spaced transverse overlaps. These transverse overlaps and the tongue and grooves together provide overlapping that circumscribes the connector plate.

While the invention has been described with a great deal of detail, it is believed it essentially comprises, a shutter assembly including a movable shutter selectively closing an X-ray window and a mounting plate, universally movable within a limited range and overlapped by other elements of the assembly to prevent the escape of radiation in any position within such range.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An assembly for connecting a collimator or the like to an X-ray tube housing having a window therein comprising, a mounting plate for connection to such housing and having inner and outer faces, a shutter movably carried by said plate adjacent said inner face, said shutter having a closed position and an open position, the plate having a mounting support recess formed adjacent said outer face, the plate having an X-ray transmission hole extending from said recess to said shutter, said plate having spaced surfaces defining the side walls of said recess, each of said surfaces having a curved groove formed therein, a collimator mounting support having spaced curved guide tongues, each of said tongues being disposed in one of said grooves, said support having a through hole communicating with said plate hole, and said support being shiftable laterally in a curved path guided by said curved grooves.

2. The device of claim 1 wherein the tongues are loosely fit in the respective grooves.

3. The device of claim 1 wherein a filter wheel is journaled in the plate and said wheel has a plurality of circumferentially spaced filters positionable one at a time in alignment with such window and said bores.

4. A shutter assembly for an X-ray diffraction tube or the like, comprising, a generally rectangular mounting plate having an outer face and an inner tube housing abutment face, said mounting plate including a shutter receiving recess extending from the abutment face towards the outer face, said mounting plate including a through X-ray transmitting passage extending from the recess to the front face, a shutter member disposed in the shutter recess and rectilinearly movable therein, said shutter member including a shutter portion selectively positionable across said recess, said shutter member also including an actuating stem extending outwardly from said shutter recess, a filter retaining plate selectively connectable to said mounting plate and spaced from said shutter recess on the outer face side of the shutter recess, a filter wheel positioned between the plates and journaled in at least one of them, said filter wheel including apertures selectively alignable with said mounting plate passage one at a time, means carried by at least one of the plates and connected to the wheel to index said apertures into passage alignment one at a time, said filter retaining plate including a connector plate receiving recess, a connector plate disposed in said connector plate recess, and said retaining and connector plates including overlapping portions extending around the perimeter of the connector plate, said connector and retainer plate including X-ray pervious passages aligned with said mounting plate passage for the transmission of X-rays therethrough.

5. The device of claim 4 wherein the connector plate and the connector plate recess are arcuately curved and said overlapping portions include arcuately curved tongue and groove means along the sides of the recess.

6. A shutter mechanism for use with an X-ray tube wherein auxiliary apparatus may be aligned, connected or otherwise associated with the shutter mechanism while the X-ray tube is operating without any resultant X-ray leakage, said shutter mechanism comprising:

(a) an X-ray impervious shutter housing having a through passage for the transmission of X-rays emitted by the X-ray tube;

(b) a shutter movably mounted on said housing, said shutter having a closed position blocking the passage of X-rays and an open position permitting the passage of X-rays;

(c) an X-ray impervious connector element movably mounted on said housing for universal movement of a limited range relative to said housing, said connector element including a through passage for communication with the through passage of said shutter housing;

(d) said element and said housing including overlapping portions blocking the emission of X-rays in any direction other than through said communicating passages when said connector element is in any position on said housing;

(e) said shutter being disposed on the shutter housing passage side of the connector element and across the connector element passage wherein the connector element may be positioned for connection with such auxiliary structure while the shutter is in the closed position.

7. The shutter mechanism of claim 6 wherein said overlapping portions include first and second tongues disposed respectively in first and second tongue guides along opposite sides of said connector element.

8. The shutter mechanism of claim 7 wherein said connector element includes an outer mounting surface, and said tongues and tongue guides are arcuate to provide angular movement of said outer mounting surface relative to said housing.

9. A shutter mechanism for use with an X-ray diffraction apparatus or the like comprising:

(a) a shutter mounting member adapted to be mounted on the housing of an X-ray tube or the like;

(b) said mounting member having an X-ray transmitting passage alignable with an X-ray beam emitted from the tube;

(c) said mounting member having a light ray transmitting passage for indicating a shutter condition, said light ray transmitting passage being spaced from said X-ray transmitting passage;

(d) said mounting member including shutter receiving portions; and (e) a shutter member reciprocally mounted in said shutter receiving portions and movable to block ray transmission through both said passages.

10. The device of claim 9 wherein said shutter member has a central X-ray impervious portion, a light ray impervious portion on one side and spaced from the X-ray impervious portion, and an arm portion connecting said X-ray and light ray impervious portions; and said X-ray and light ray impervious portions selectively blocking said X-ray and light ray transmitting passages respectively.

11. The device of claim 10 wherein said mounting member includes a second light ray transmitting passage spaced from said X-ray transmitting passage and on a side opposite said the first light ray transmitting passage, and said shutter member includes a second light ray impervious portion spaced and on the other side of said central X-ray impervious portion, and another arm connecting said X-ray and second light ray impervious portions whereby said second light ray impervious portion selectively blocks ray transmission in said second passage.

12. The device of claim 11 including yieldable means connected to said mounting and shutter members to bias said shutter member in said closed position thereby blocking ray transmission in said passages.

13. The device of claim 12 including a latch to fix said shutter member in the open position against the bias of said yieldable means.

14. A shutter mechanism for use with an X-ray tube face comprising:

(a) a shutter housing mountable on the face of the X-ray tube;

(b) said shutter housing including an X-ray transmitting passage and a light ray transmitting passage;

(c) a single shutter member movably mounted on said shutter housing and including an X-ray impervious portion and a light ray impervious portion; and (d) said shutter member being movable between first and second positions where said X-ray and light impervious portions block and permit respectively ray transmission through said passages.

15. The device of claim 14 wherein said shutter housing has two such light ray transmitting passages and said shutter member has two light ray impervious portions so that if light rays cease to transmit through one light passage the other passage is available to provide a visual indication of shutter position.

16. A shutter mechanism for use with an X-ray tube wherein auxiliary apparatus may be aligned, connected or otherwise associated with the shutter mechanism while the X-ray tube is operating without any resultant X-ray leakage, said shutter mechanism comprising:

(a) an X-ray impervious shutter mounting element having inner and outer surfaces, said shutter mounting element having a through passage between said surfaces for the transmission of X-rays emitted by the tube;

(b) said shutter mounting element having a shutter receiving portion;

(c) a shutter movably connected to said shutter receiving portion, said shutter having a closed position blocking the passage of X-rays and an open position permitting the passage of X-rays;

(d) an X-ray impervious connector element movably mounted on the outer surface of the shutter mounting element for movement within a limited range; and (e) said connector element including a through passage communicating with the through passage of said shutter mounting element and positioned to be closed by said shutter when the shutter is in the open position whereby such auxiliary apparatus may be placed in X-ray tight association with the shutter mechanism when the shutter is closed.

17. The shutter mechanism of claim 16 wherein said shutter receiving portion is a recess in the inner face of said shutter mounting member so that said shutter is immediately adjacent the X-ray tube.

18. The shutter mechanism of claim 16 including, in combination:

(f) yieldable means connected to said shutter and one of said elements to bias said shutter in said closed position blocking the passage of X-rays.

19. The shutter mechanism of claim 18 including, in combination:

(g) said shutter including a stem portion projecting from said shutter receiving portion;

(h) said stem portion and one of the elements being coacting members; and (i) latch means carried by one of said members and selectively interconnectable with the other of the members to lock said shutter in the open position against the bias of said yieldable means.

20. In a shutter mechanism for mounting on an X-ray tube surface and for providing X-ray tight passage of X-rays from a window in the X-ray tube to one or more devices connected, aligned, or otherwise positioned in X-ray tight association with the shutter mechanism, the combination wherein such associated device is angularly movable relative to the surface of the X-ray tube while maintaining the X-ray tight passage, said combination comprising:

(a) an X-ray impervious shutter mounting element mountable on the X-ray tube surface and having a through passage for the transmission of X-rays emitted from the window of the X-ray tube;

(b) an X-ray impervious connector element movably mounted on said shutter mounting element for movement of a limited range relative to said mounting element;

(c) said connector element including a through passage communicable with the through passage of said mounting element, said connector element having an outer mounting surface adjacent its through passage;

(d) a shutter movably mounted on at least one of said elements, said shutter having a first position blocking the passage of X-rays and a second position permitting the passage of X-rays;

(e) said mounting and connector elements including overlapping portions blocking the emission of X-rays in any direction other than through said passages when said connector element is in any position within such range, and at least portions of said overlapping portions being arcuate to provide angular movement of the connector element mounting surface relative to the X-ray tube surface in at least one direction of movement within said limited range.

21. The combination of claim 20 wherein the arcuate portions of said overlapping portions include tongue and tongue guide means along opposite sides of said connector element.

22. In combination:

(a) an X-ray tube having a plurality of longitudinally extending faces, each of said faces having an X-ray window therein;

(b) a plurality of shutter mechanisms each removably secured to a tube face, each of said shutter mechanisms including an X-ray passage communicating with the X-ray window in its associated tube face;

(c) said shutter mechanisms abutting along their adjacent edges to form a tubular cover surrounding said X-ray tube;

(d) portions of said tube and each set of abutting edges defining a space;

(e) a light source disposed in each of the spaces;

(f) each of said shutter mechanisms having signal openings communicating with the spaces at its edges;

(g) each of said shutter mechanisms including an X-ray impervious shutter movable between a closed position blocking its X-ray passage and an open position permitting the transmission of X-rays through the passage;

(h) each of said mechanisms including light impervious shutters movable between a first position blocking said signal openings and a second position permitting the passage of light through said signal openings; and (i) means connecting the shutters of each shutter mechanism whereby opening movement of the X-ray impervious shutter causes like opening movement of the light impervious shutters.

23. In combination:

(a) an X-ray tube housing having at least two faces defining a corner along their adjacent edges;

(b) each of said tube faces having an X-ray window;

(c) shutter mechanisms secured to said tube housing and each having an X-ray passage in communication with one of said windows;

(d) each of said mechanisms being in abutting relation with one of the tube faces;

(e) the adjacent edges of said mechanisms being in abutting relation and defining a light compartment with said corner;

(f) said mechanisms each including a signal opening communicating with said light compartment;

(g) a light source disposed in said light compartment;

(h) each of said mechanisms including a shutter movable between a closed position blocking the X-ray passage and an open position permitting the passage of X-rays through said passage;

(i) each of said mechanisms including a light shield movable between a closed position blocking the passage of light through said signal opening and an open position permitting the passage of light through said signal opening; and (j) means connecting said light shield to the shutter in their respective shutter mechanism so that movement of said shutter to its open position causes movement of said light shield to its open position.

24. A shutter assembly for an X-ray diffraction tube or the like comprising:
   (a) a mounting plate including inner and outer faces, a shutter-receiving portion, and a through X-ray transmitting passage extending between said faces;
   (b) a shutter member movably disposed in the shutter-receiving portion and including an X-ray impervious portion selectively positionable across said X-ray transmitting passage;
   (c) a filter retaining plate selectively connectable to said mounting plate and spaced from the shutter-receiving portion;
   (d) a filter wheel positioned between the plates and journaled in at least one of them, said filter wheel including apertures selectively alignable with said mounting plate passages one at a time;
   (e) means carried by at least one of the plates and connected to the filter wheel to index said apertures into passage alignment one at a time;
   (f) said filter-retaining plate including a connector plate receiving portion, a connector plate movably disposed in said connector plate receiving portion;
   (g) said retaining and connector plates including overlapping portions extending around the perimeter of the connector plate; and,
   (h) said connector and retainer plates including X-ray transmitting passages communicable with said mounting plate passage for the transmission of X-rays therethrough.

25. The device of claim 24 wherein the means to index the filter wheel includes a pinion fixed to the filter wheel and a gear segment fixed to a shaft rotatably supported in at least one of the plates, and said gear segment meshes with said pinion, whereby rotation of the shaft causes rotation of said filter wheel.

26. A shutter assembly for use with X-ray diffraction tube or the like comprising:
   (a) a shutter housing defining a through passage for the transmission of X-rays or the like;
   (b) shutter means connected to the housing and selectively positionable across said passage;
   (c) a filter wheel rotatably carried by the housing, said filter wheel including a plurality of apertures selectively alignable with the X-ray passage one at a time;
   (d) an X-ray filter carried by at least one of the apertures;
   (e) means for indexing said apertures into alignment with said passages one at a time including a pinion gear connected to the wheel in axial alignment therewith;
   (f) a gear segment engaging the pinion gear and carried by the housing; and
   (g) means connected to the gear segment to selectively rotate the segment and thereby index the wheel.

27. A shutter mechanism for an X-ray tube or the like comprising, an X-ray impervious housing having a through passage for the transmission of X-rays emitted by the tube, a shutter movably carried by the housing and having a first position blocking the passage of X-rays and a second position permitting the passage of X-rays, the housing including an X-ray impervious connector element having an aperture defining a part of said passage, said connector element being movable relative to the remainder of the housing universally over a limited range, said connector element and said remainder of the housing including overlapping portions blocking the emission of X-rays in any direction other than through said aperture when said connector element is in any position within said range, said overlapping portions including first and second arcuately curved tongue and groove means along opposite sides of said connector element so that said connector element is movable angularly relative to the X-ray tube, and said connector element including spaced end portions transverse to the tongue and groove means, each located at all times on the X-ray tube side of a plane located by the furthest extending portion of the passage defined by said remainder of the housing.

References Cited in the file of this patent

UNITED STATES PATENTS

| | | |
|---|---|---|
| 2,094,103 | Horsley et al. | Sept. 28, 1937 |
| 2,453,798 | Kloos | Nov. 16, 1948 |
| 2,593,526 | Bell et al. | Apr. 22, 1952 |